United States Patent
Nishida

(10) Patent No.: US 7,715,624 B2
(45) Date of Patent: May 11, 2010

(54) RECOGNIZING OR REPRODUCING A CHARACTER'S COLOR

(75) Inventor: Hirobumi Nishida, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 1447 days.

(21) Appl. No.: 11/088,891

(22) Filed: Mar. 25, 2005

(65) Prior Publication Data

US 2005/0213811 A1 Sep. 29, 2005

(30) Foreign Application Priority Data

Mar. 25, 2004 (JP) ............................ 2004-088716

(51) Int. Cl.
- G06K 9/00 (2006.01)
- G06K 9/40 (2006.01)
- G06K 9/54 (2006.01)
- H04N 1/40 (2006.01)

(52) U.S. Cl. .................. 382/170; 382/165; 382/260; 382/305; 358/462

(58) Field of Classification Search .............. 382/170, 382/164, 260, 305; 358/462
See application file for complete search history.

(56) References Cited

U.S. PATENT DOCUMENTS

| | | | | |
|---|---|---|---|---|
| 5,909,505 A | * | 6/1999 | Katayama et al. | 382/164 |
| 5,933,249 A | * | 8/1999 | Shimura et al. | 382/239 |
| 5,956,470 A | * | 9/1999 | Eschbach | 358/1.9 |
| 6,463,173 B1 | * | 10/2002 | Tretter | 382/168 |
| 6,546,132 B1 | * | 4/2003 | Bhattacharjya et al. | 382/167 |
| 6,556,711 B2 | * | 4/2003 | Koga et al. | 382/173 |
| 6,628,833 B1 | * | 9/2003 | Horie | 382/173 |
| 6,693,718 B1 | * | 2/2004 | Takaoka | 358/1.15 |
| 6,941,321 B2 | * | 9/2005 | Schuetze et al. | 707/103 R |
| 7,145,691 B2 | * | 12/2006 | Kato | 358/1.9 |
| 2002/0037100 A1 | * | 3/2002 | Toda et al. | 382/166 |
| 2002/0049979 A1 | * | 4/2002 | White et al. | 725/87 |
| 2003/0133607 A1 | * | 7/2003 | Goto et al. | 382/162 |
| 2004/0165782 A1 | * | 8/2004 | Misawa | 382/239 |
| 2004/0175031 A1 | * | 9/2004 | Katsuyama | 382/165 |
| 2004/0257622 A1 | * | 12/2004 | Shibaki et al. | 358/2.1 |
| 2005/0078867 A1 | * | 4/2005 | Kanno | 382/163 |

(Continued)

FOREIGN PATENT DOCUMENTS

JP 2000-125134 A 4/2000

(Continued)

OTHER PUBLICATIONS

"Automatic Text Location in Images and Video Frames" by Anil K. Jain and Bin Yum, Pattern Recognition, vol. 31, No. 12, pp. 2055-2075, 1998.

(Continued)

*Primary Examiner*—Aaron W Carter
*Assistant Examiner*—Kathleen S Yuan
(74) *Attorney, Agent, or Firm*—Dickstein Shapiro LLP

(57) ABSTRACT

A method, apparatus and system, each capable of recognizing or reproducing a character color, are disclosed. An original image is divided into a character image and a background image. The color information of the character image is obtained to generate a color palette of the character image. A color, defined by the color palette, is assigned to each of the characters in the character image. The color palette may include a main color palette and a minor color palette.

12 Claims, 13 Drawing Sheets

U.S. PATENT DOCUMENTS

2006/0023236 A1 * 2/2006 Sievert et al. .............. 358/1.12

FOREIGN PATENT DOCUMENTS

JP        2001-127998 A     5/2001

OTHER PUBLICATIONS

"Extracting Text from WWW Images" by Jiangying Zhou and Daniel Lopresti, Panasonic Information and Networking Technology Laboratory, 0-8186-7898-4/97 $10.00 (c) 1997 IEEE (5 pages).

"Locating Text in Complex Color Images" by Yu Zhong, et al., Pattern Recognition, vol. 28, No. 10, pp. 1523-1535, 1995.

* cited by examiner

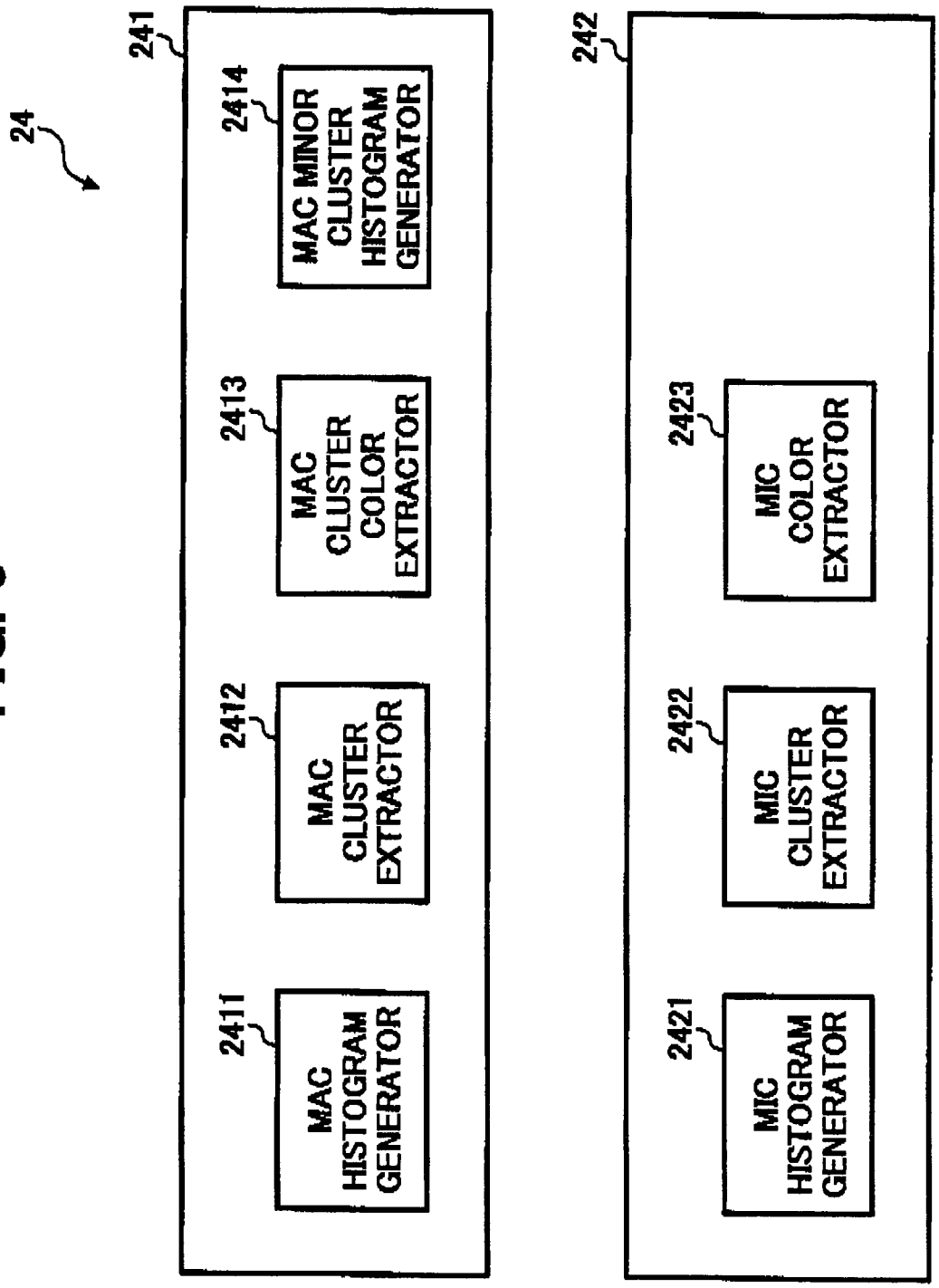

| DIMENSION | CENTER | | % |
|---|---|---|---|
| | YCbCr | RGB | |
| 1 | [7, 14] × [14, 16] × [14, 18] | (9, 15, 15) | (61, 79, 58) | 69.4 |
| 2 | [22, 25] × [14, 16] × [14, 18] | (24, 14, 15) | (181, 202, 164) | 23.2 |
| 3 | [10, 13] × [14, 16] × [17, 18] | (11, 18, 16) | (88, 83, 116) | 3.5 |
| 4 | [15, 17] × [15, 15] × [15, 16] | (17, 15, 16) | (136, 138, 122) | 1.5 |
| 5 | [17, 17] × [12, 12] × [16, 16] | (17, 12, 16) | (136, 147, 80) | 1.5 |
| 6 | [14, 15] × [20, 20] × [9, 10] | (14, 20, 9) | (34, 140, 168) | 0.9 |

RECOGNIZING OR REPRODUCING A CHARACTER'S COLOR

CROSS REFERENCE TO RELATED APPLICATIONS

This patent application is based on and claims priority to Japanese patent application No. JPAP2004-088716 filed on Mar. 25, 2004, in the Japanese Patent Office, the entire contents of which are hereby incorporated by reference.

FIELD OF THE INVENTION

The present invention relates to a method, apparatus, system, computer program or product, each capable of recognizing or reproducing a character's color.

DESCRIPTION OF THE RELATED ART

In most cases, a color image is read or generated at a low resolution to increase the image processing speed or to save memory space.

However, if the low-resolution image contains a character or line, the portion of the image containing the character or line may not be accurately recognized, or may not be produced in high quality. For example, the character line color may not be clearly defined, or more than one color may be assigned to one character.

Further, color clustering may be applied to the color image to increase the image processing speed or to save memory space. However, if the color image includes a large number of characters colored in black, non-black colors in the image may not be extracted.

BRIEF SUMMARY OF THE INVENTION

Exemplary embodiments of the present invention include a method, apparatus, system, computer program or product, each capable of recognizing or reproducing a character's color.

In one exemplary embodiment, an original image is divided into a character image and a background image. The character image includes one or more characters, however, a line or a symbol may be treated as a character. The color information of the character image is obtained. Using the color information, a color palette of the character image is generated. A color, defined by the color palette, is assigned to each of the characters in the character image.

In this exemplary embodiment, the color palette may include one or more colors obtained based on the statistics of the color information.

Alternatively, the color palette may include a main color palette and a minor color palette.

In another exemplary embodiment, the resolutions of the character image and the background image may be increased.

In yet another exemplary embodiment, a low resolution binary image may be created, based on the original image, to obtain the character image and the background image.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 9 is a block diagram illustrating the color palette generator of FIG. 8 according to an exemplary embodiment of the present invention;

DETAILED DESCRIPTION OF THE INVENTION

Figure 1:
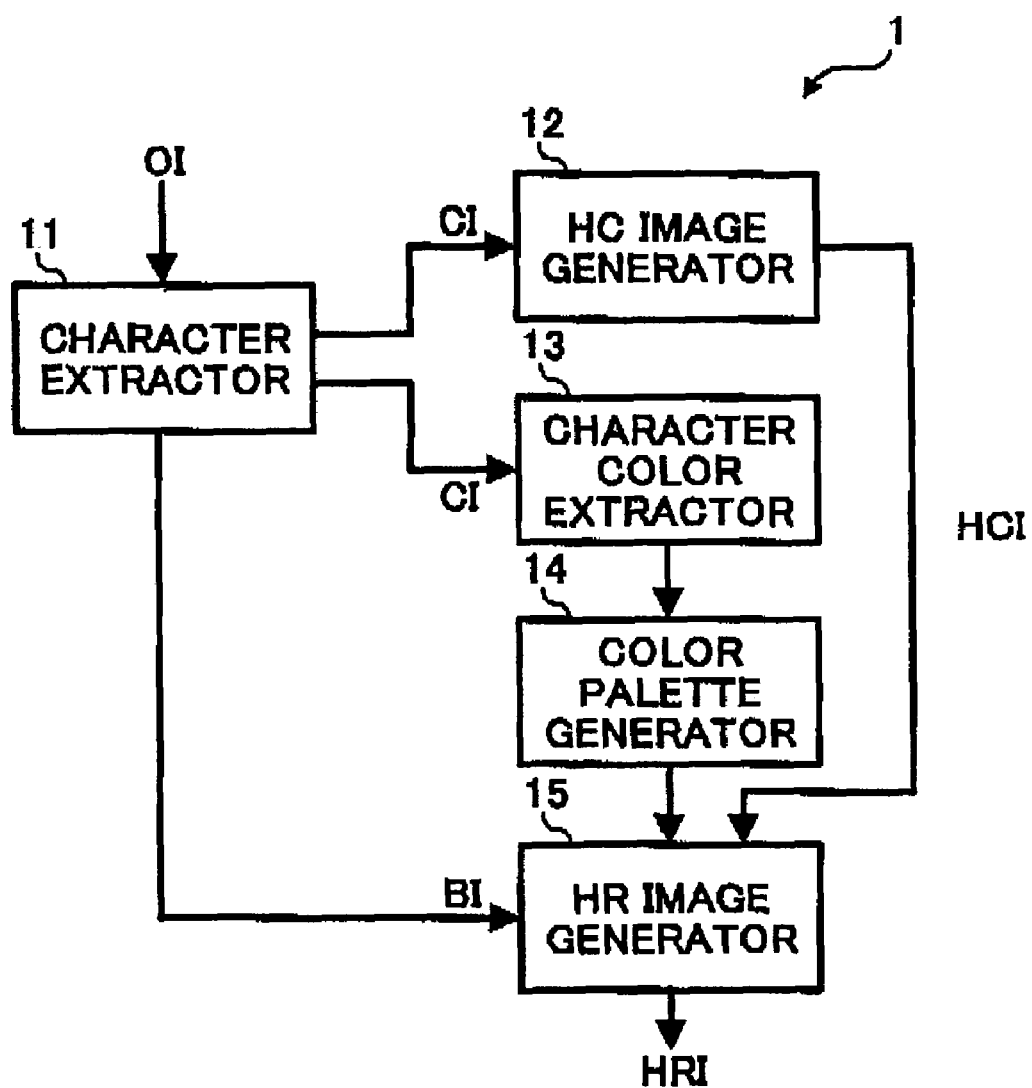
FIG. 1 is a block diagram illustrating an exemplary image processor according to an exemplary embodiment of the present invention.

In describing the preferred embodiments illustrated in the drawings, specific terminology is employed for clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views.

FIG. 1 illustrates an image processor 1 of the present invention. The image processor 1 of FIG. 1 includes a character extractor 11, a HC (high resolution character) image generator 12, a character color extractor 13, a color palette generator 14, and a HR (high resolution) image generator 15.

The character extractor 11 receives an original image OI having one or more characters. The character extractor 11 extracts each of the characters in the original image OI as a character image CI. At the same time, the unextracted portion of the original image OI is defined as a background image BI.

The HC image generator 12 generates a high resolution character image HCI based on the character image CI. The high resolution character image HCI has a resolution higher than the resolution of the character image CI.

The character color extractor 13 extracts color information indicating the color of each pixel in the character image CI. The color information may be expressed in brightness values based on the RGB color space, for example.

The color palette generator 14 generates a color palette, which indicates a group of one or more colors to be assigned to the pixels in the character image CI based on the color information.

The HR image generator 15 generates a high resolution image HRI corresponding to the original image OI. In this exemplary embodiment, the HR image generator 15 generates a high resolution background image HBI from the background image BI. The HR image generator 15 assigns one of the colors, defined by the color palette, to the corresponding character of the high resolution character image HCI. The HR image generator 15 combines the character image HCI and the background image HBI.

Figure 2:
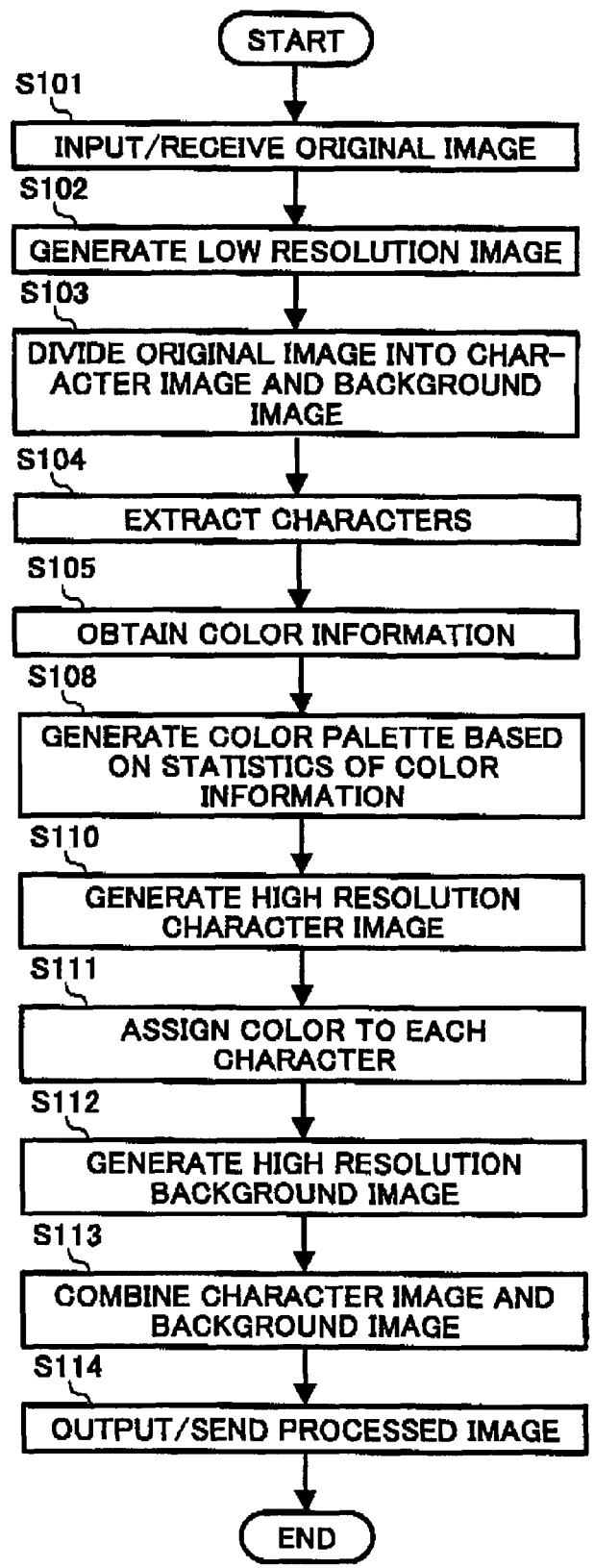
FIG. 2 is a flowchart illustrating an exemplary operation performed by the image processor of FIG. 1 according to an exemplary embodiment of the present invention.

Referring to FIG. 2, an exemplary image processing operation performed by the image processor 1 is explained.

Figure 3:
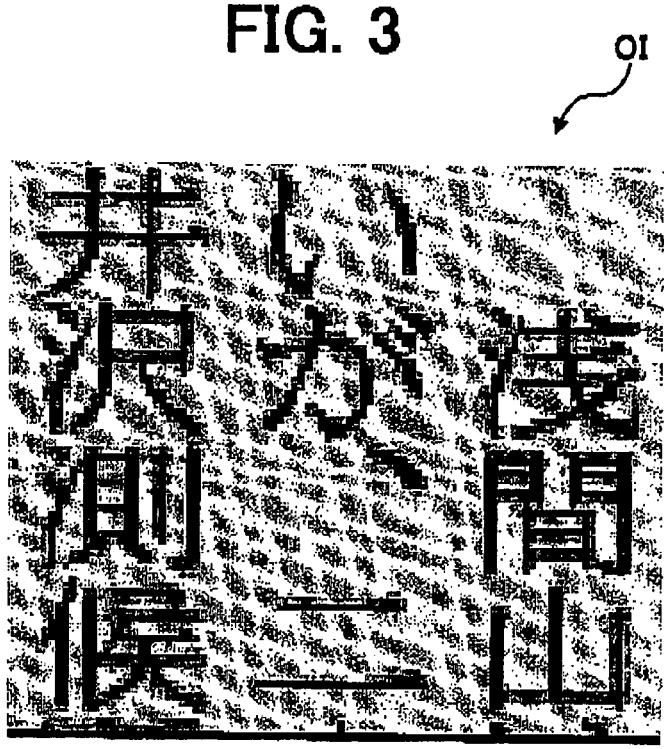
FIG. 3 is an illustration of an exemplary original image input to the image processor of FIG. 1.

Step S101 inputs or receives an original image OI. In this exemplary embodiment, the original image OI is a color multivalue image having a plurality of characters, as illustrated in FIG. 3. However, the image processor of FIG. 2 is capable of processing any kind of image, including a grayscale multivalue image.

Step S102 generates a low resolution image based on the original image OI.

Step S103 extracts a character image from the low resolution image. At the same time, a background image of the low resolution image is defined.

First, to define which part of the image is the character image, binarization is applied to the low resolution image. The binarization methods may include, for example, the global binarization method, such as discriminational analysis, or moment-preserving thresholding, and the adoptive binarization method. Alternatively, the global binarization method and the adoptive binarization method may be combined. Further, the binarization method, disclosed in U.S. Patent Publication No. 2005/0031220 filed on Aug. 6, 2004, the entire contents of which are hereby incorporated by reference, may be used.

Figure 4:
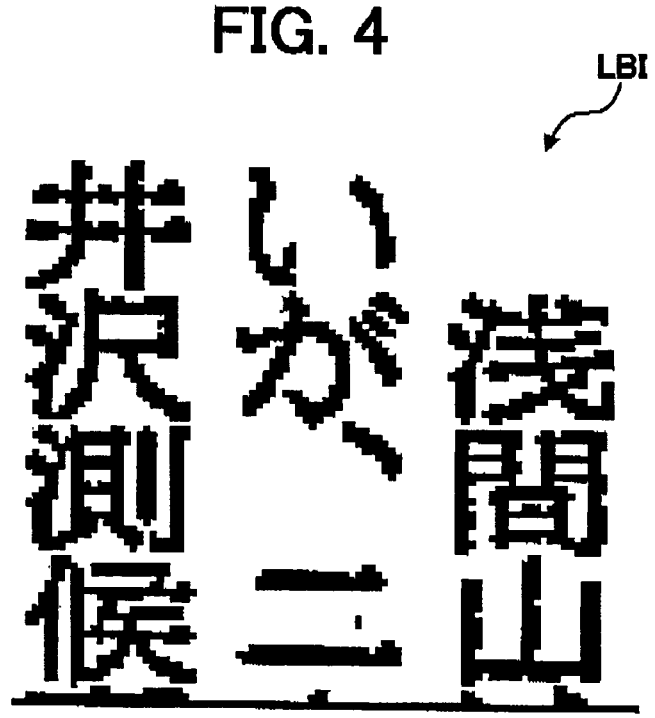
FIG. 4 is an illustration of an exemplary low resolution binary image corresponding to the original image of FIG. 3 according to an exemplary embodiment of the present invention.

FIG. 4 illustrates the low resolution binary image LBI, corresponding to the original image OI of FIG. 3, generated in step S102. In FIG. 4, the black pixels indicate the pixels belonging to the character image CI, while the white pixels indicate the pixels belonging to the background image BI.

Step S104 extracts each of the characters in the character image CI. In this exemplary embodiment, the pixels belonging to the character image CI are classified into a plurality of groups, with each group preferably corresponding to one character in the character image.

Figure 5:
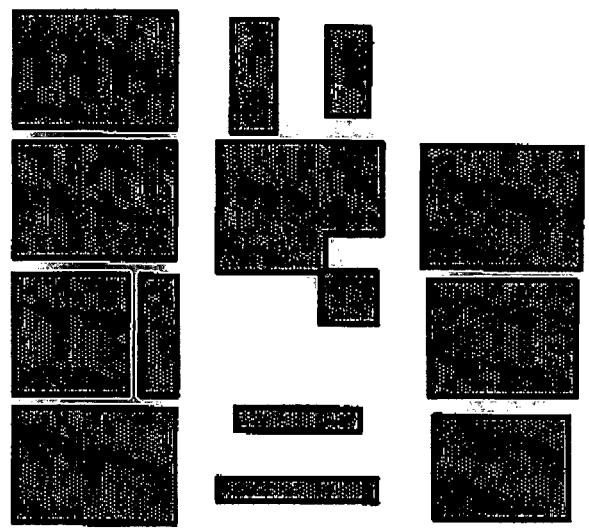
FIG. 5 is an illustration of bounding boxes formed based on the binary image of FIG. 4 according to an exemplary embodiment of the present invention.

For example, as illustrated in FIG. 5, a bounding box may be formed to define each of the characters. The size of the bounding box may be previously defined based on the resolution or character type, for example. If the image LBI is generated at 200 dpi, the bounding box having a vertical length of 3 to 40 pixels, or the bounding box having a horizontal length of 3 to 40 pixels may be formed. Based on the bounding box, the pixels belonging to one character or a part of one character can be recognized.

Step S105 obtains color information indicating the color of each pixel belonging to the character image CI. In this exemplary embodiment, the color information is expressed based on the RGB color space.

Step S108 generates a color palette of the character image CI. In this exemplary embodiment, a single color is defined for each of the characters extracted in Step S104. Thus, the pixels of one character can be made uniform in color.

In one example, the average RGB value (R0, G0, B0) of a target character, i.e., a target bounding box, is obtained. Next, the lowest RGB value (R1, G1, B1) of the target character is obtained. The color of the target character is obtained by averaging the average RGB value (R0, G0, B0) and the lowest RGB value (R1, G1, B1). This process is repeated for each of the characters in the character image CI. As a result, the color palette of the character image CI is created.

In another example, the average RGB value (R0, G0, B0) of a target character, i.e., a target bounding box, is obtained. Next, the standard deviation (Sr, Sg, Sb) of the target character is obtained. The color of the target character may be extpressed as (R0-$c$*Sr, G0-$c$*Sg, B0-$c$*Sb), with the value c indicating a fixed integer. This process is repeated for each of the characters in the character image CI. As a result, the color palette of the character image CI is created.

In addition to the above-described methods, any statistical method may be used as long as the distortion, caused by scanning, is suppressed.

Figure 6:
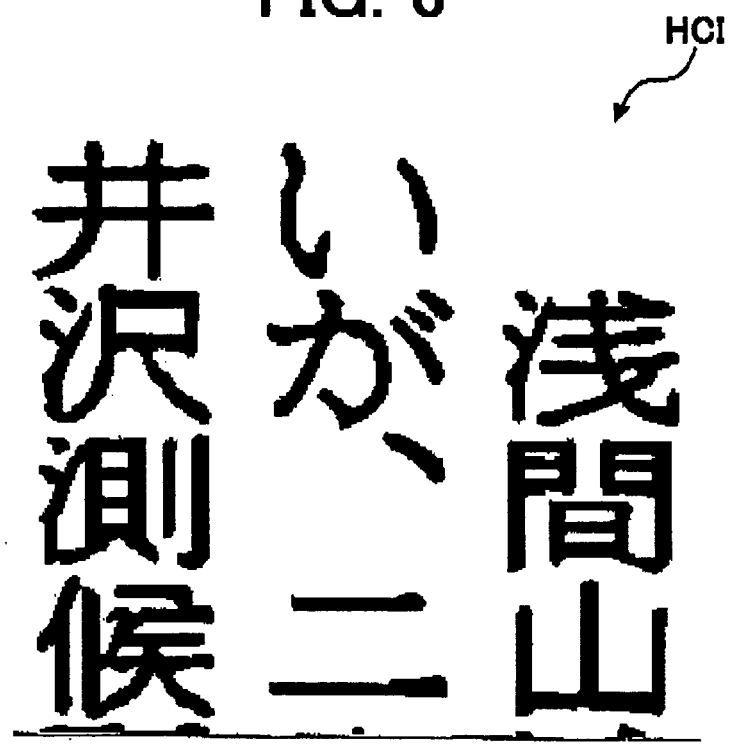
FIG. 6 is an illustration of an exemplary high resolution character image corresponding to the original image of FIG. 3 according to an exemplary embodiment of the present invention.

Step S110 generates a high resolution character image HCI, illustrated in FIG. 6, based on the character image CI. In this step, image processing, such as filtering or edge enhancement, may be applied to increase the image quality.

Step S111 assigns the color defined by the color palette to each of the characters in the character image HCI.

Step S112 generates a high resolution background image based on the background image BI using an interpolation method known in the art.

Figure 7:
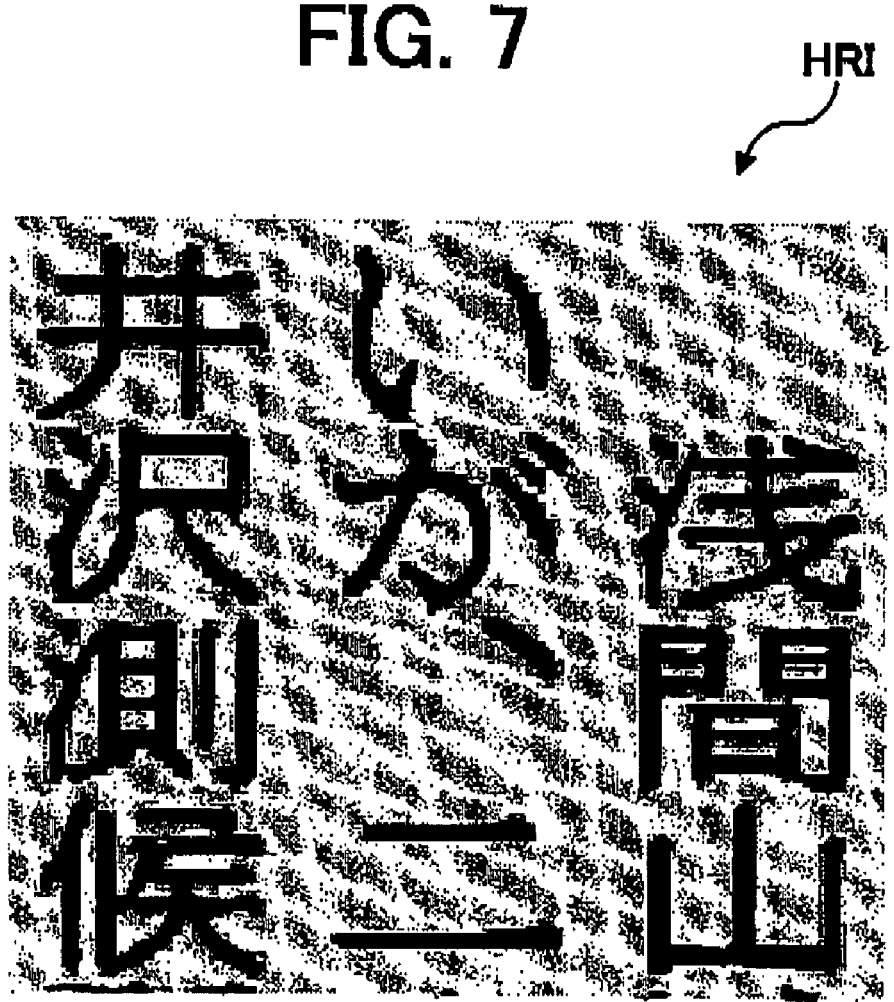
FIG. 7 is an illustration of an exemplary high resolution image corresponding to the original image of FIG. 3 according to an exemplary embodiment of the present invention.

Step S113 combines the high resolution character image HCI and the high resolution background image into the high resolution image HRI, as illustrated in FIG. 7.

Step S114 outputs or sends the high resolution image HRI.

Figure 8:
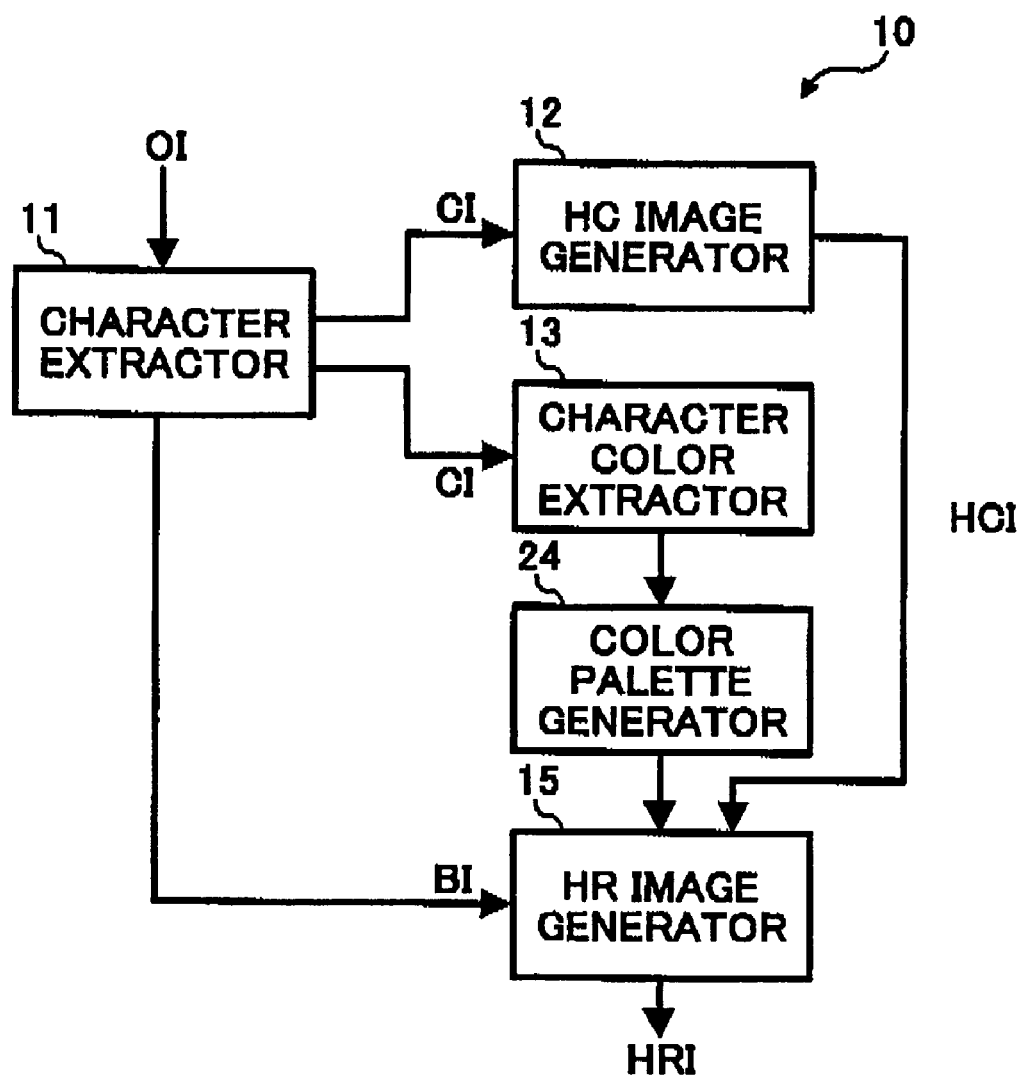
FIG. 8 is a block diagram illustrating an exemplary image processor according to an exemplary embodiment of the present invention.

FIG. 8 illustrates an image processor 10 according to another preferred embodiment of the present invention.

The image processor 10 of FIG. 8 is similar in structure to the image processor 1 of FIG. 1, except for the color palette generator 24. The color palette generator 24 generates at least two kinds of color palettes.

As shown in FIG. 9, the color palette generator 24 includes a main color palette generator 241 and a minor color palette generator 242.

The main color palette generator 241 generates a main color palette, which indicates a group of one or more colors ("main colors") used in more than 50% of the character image CI.

As shown in FIG. 9, the main color palette generator 241 includes a MAC (main color) histogram generator 2411, a MAC cluster extractor 2412, a MAC cluster color extractor 2413, and a MAC minor cluster histogram generator 2414. The MAC histogram generator 2411 selects the pixels having the main colors ("main color pixels"), and generates a histogram showing the distribution of the main color pixels. The MAC cluster extractor 2412 classifies the main color pixels into one or more clusters, and selects the cluster having the largest number of main color pixels. The MAC cluster color extractor 2413 defines the color representing the selected cluster. The MAC minor cluster histogram generator 2414 selects the pixels not belonging to the selected cluster, and generates a histogram showing the distribution of the main color pixels not belonging to the selected cluster.

The minor color palette generator 242 defines a minor color, which indicates a group of one or more colors ("minor colors") used in less than 50% of the character image CI.

As shown in FIG. 9, the minor color palette generator 242 includes a MIC (minor color) histogram generator 2421, a MIC cluster extractor 2422, and a MIC color extractor 2423. The MIC histogram generator 2421 generates a histogram showing the distribution of the minor color pixels. The MIC cluster extractor 2422 classifies the minor color pixels into one or more clusters. The MIC color extractor 2423 defines the color representing each of the extracted clusters.

Figure 10A:
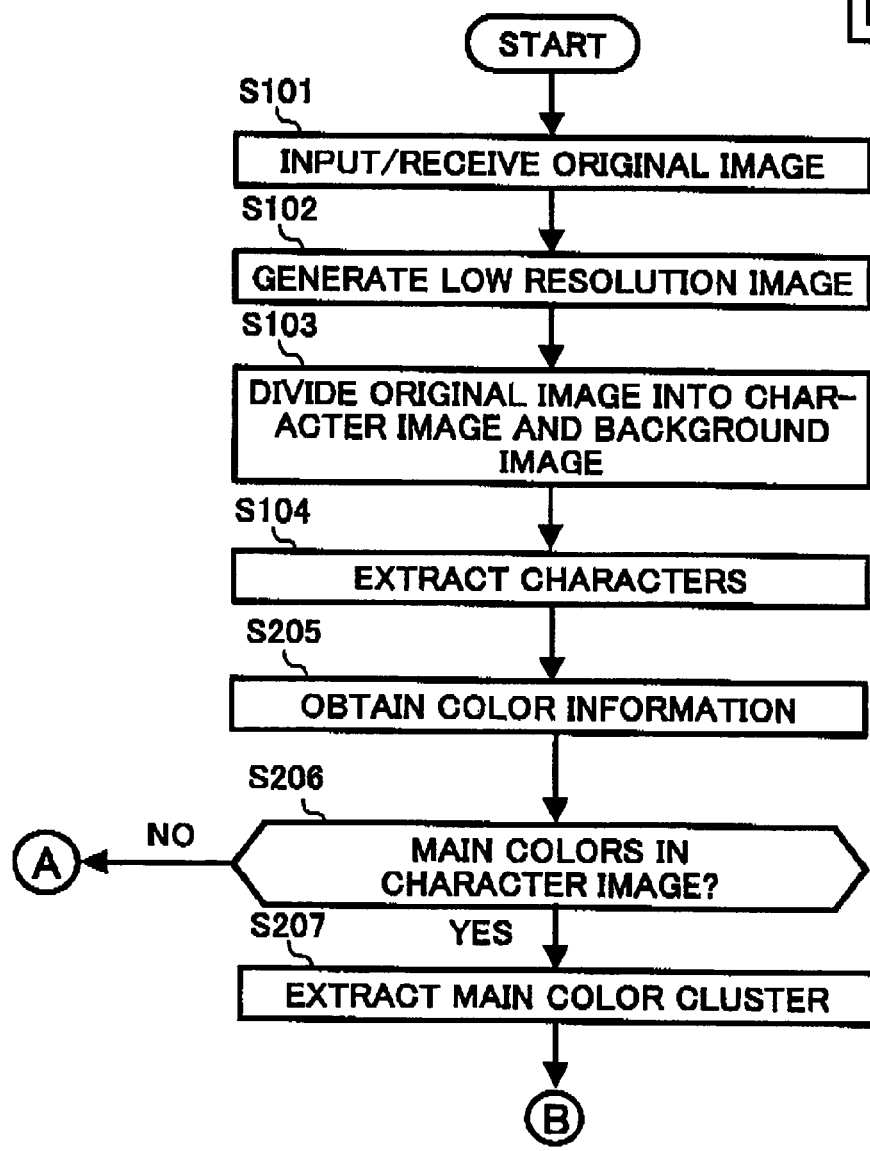
FIGS. 10A and 10B are flowcharts illustrating an exemplary operation performed by the image processor of FIG. 9 according to exemplary embodiments of the present invention.
Figure 10B:
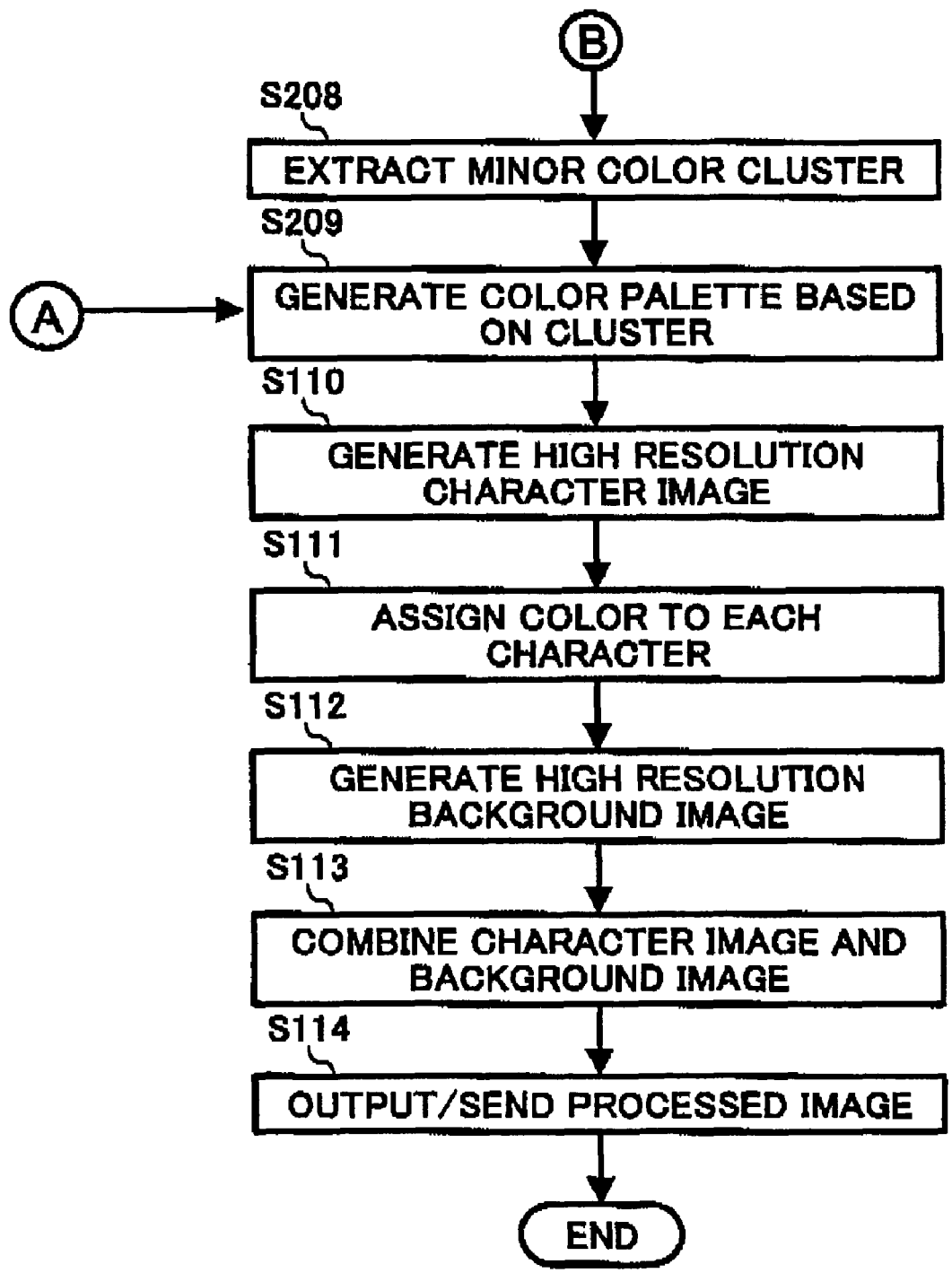

Referring to FIGS. 10A and 10B, an exemplary image processing operation performed by the image processor 10 is explained.

Figure 11:
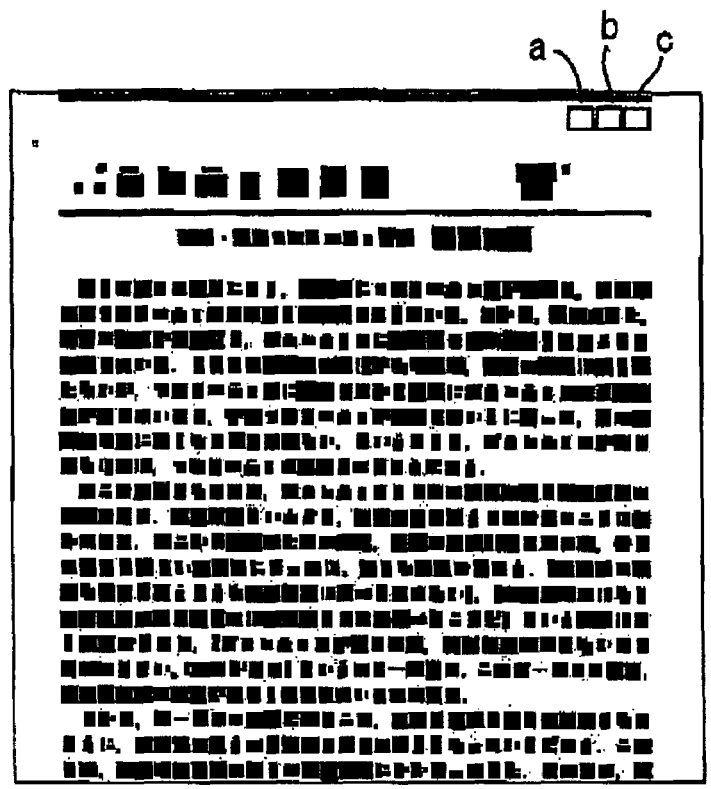
FIG. 11 is an illustration of an exemplary original image input to the image processor of FIG. 8.

Steps S101 to S104 of FIG. 10A are substantially similar to Steps S101 to S104 of FIG. 2, except that Step S101 inputs or receives an exemplary original image OI, such as the image illustrated in FIG. 11. As shown in FIG. 11, the majority of the original image OI contains black characters, while a minority of the original image OI contains characters a, b, and c with each having a color other than black.

Step S205 obtains color information from the character image. In this exemplary embodiment, the color information is expressed based on the YCbCr color space.

Step S206 determines whether the main colors are in the character image CI.

In one example, a histogram is generated for each of the Y, Cb, and Cr values. The pixels are then classified into one or more clusters using, for example, the local maximum method shown in FIG. 12. The cluster having the largest number of pixels ("main cluster") is then defined. If the number of pixels belonging to the main cluster is larger than half of the number of pixels contained in the image, the character image CI is determined to have the main color pixels, and the process moves to Step S207. Otherwise, the process moves to Step S209 of FIG. 10B to generate a color palette.

Figure 13:
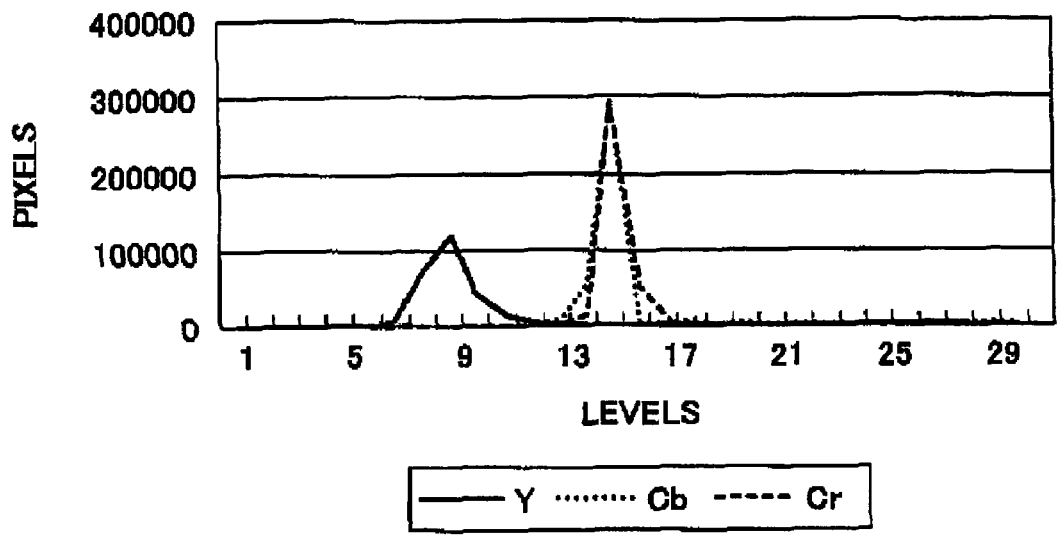
FIG. 13 is a histogram generated by the image processor of FIG. 8, based on the original image of FIG. 11, according to an exemplary embodiment of the present invention.

In this exemplary embodiment, referring to FIG. 13, a main color cluster ranging from 7 to 14 with a center of 9 is extracted for the Y value. A main color cluster ranging from 14 to 16 with a center of 15 is extracted for the Cb value. A main color cluster ranging from 14 to 18 with a center of 15 is extracted for the Cr value. The resultant main cluster, having the three-dimensional shape defined by the above YCbCr values, includes 69.4% of the pixels in the character image CI. Thus, the process moves to Step S207.

Step S207 extracts one or more main color clusters, using the color information

In this exemplary embodiment, after the main color cluster, referred to as a first main color cluster, has been extracted in Step S206, a histogram is generated for the pixels not belonging to the first main color cluster.

Figure 14:
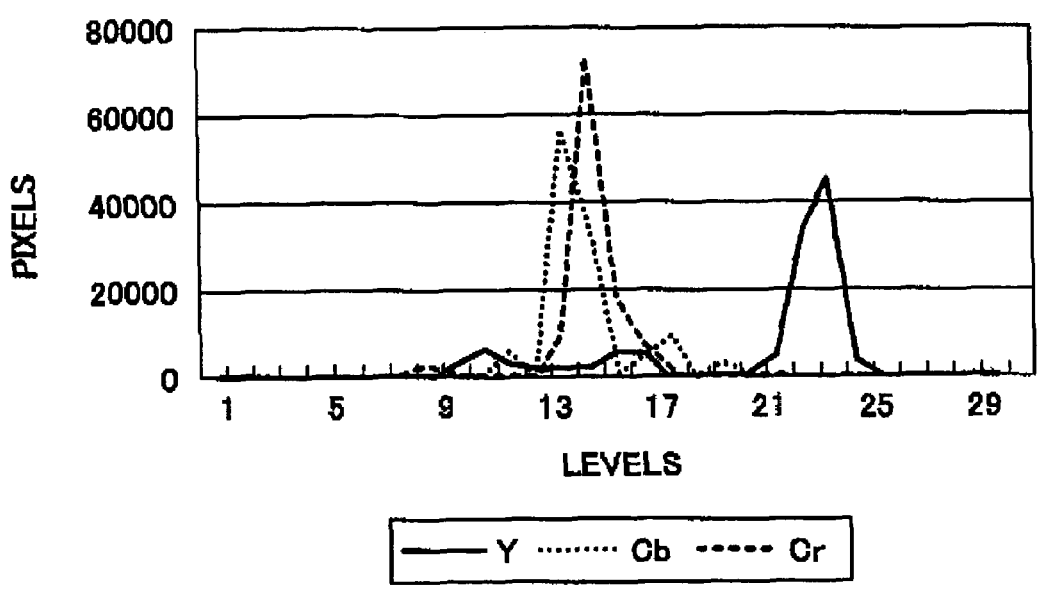
FIG. 14 is an exemplary histogram generated by the image processor of FIG. 8, based on the original image of FIG. 11, according to an exemplary embodiment of the present invention.

Referring to FIG. 14, a second main color cluster ranging from 22 to 25 with a center of 24 is extracted for the Y value. A second main color cluster ranging from 14 to 16 with a center of 14 is extracted for the Cb value. The main color cluster ranging from 14 to 18 with a center of 15 is extracted for the Cr value. The resultant second main cluster, having the three-dimensional shape defined by the above YCbCr values, includes 23.2% of the pixels in the character image CI.

Figures 15, 16:
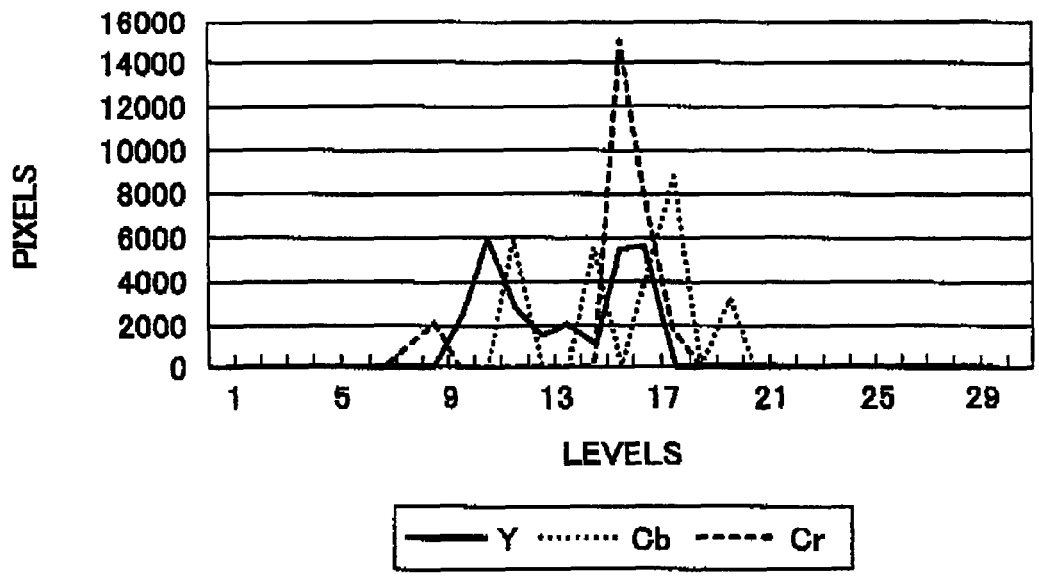
FIG. 15 is an exemplary histogram generated by the image processor of FIG. 8, based on the original image of FIG. 11, according to an exemplary embodiment of the present invention.
FIG. 16 is a table illustrating an exemplary color clusters extracted from the original image of FIG. 11 according to an exemplary embodiment of the present invention.

After the second main color cluster has been extracted, a histogram is generated for the pixels not belonging to either of the first and second main color clusters, as illustrated in FIG. 15. Referring to FIG. 15, no clusters are extracted, indicating that the operation of main color cluster extraction is completed.

Referring to FIG. 10B, Step S208 extracts one or more minor color clusters, using the color information.

Figure 12:
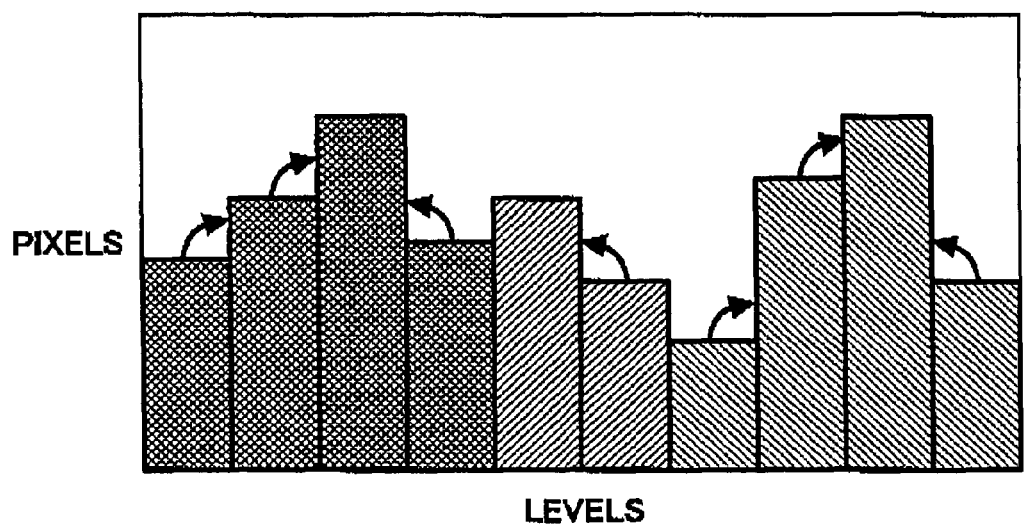
FIG. 12 is a histogram for illustrating an exemplary clustering method according to an exemplary embodiment of the present invention.

In this exemplary embodiment, a histogram is generated for each of the Y, Cb, and Cr values, in a substantially similar manner as described referring to FIG. 12. As a result, four minor color clusters are extracted, as illustrated in FIG. 16.

Step S209 generates a main color palette and a minor color palette. In this exemplary embodiment, the center of the extracted color cluster is defined as the color representing the corresponding color cluster.

Referring to FIG. 16, the main color palette includes a first color having the YCbCr value of (9, 15, 15) and a second color having the YCbCr value of (24, 14, 15). The minor color palette includes a third color having the YCbCr value of (11, 18, 16), a fourth color having the YCbCr value of (17, 15, 16), a fifth color having the YCbCr value of (17, 12, 16), and a sixth color having the YCbCr value of (14, 20, 9).

Further, in this step, the YCbCr values may be converted to RGB values.

The process proceeds through Steps S110 to S114, as described above with regard to FIG. 2.

Figure 17:
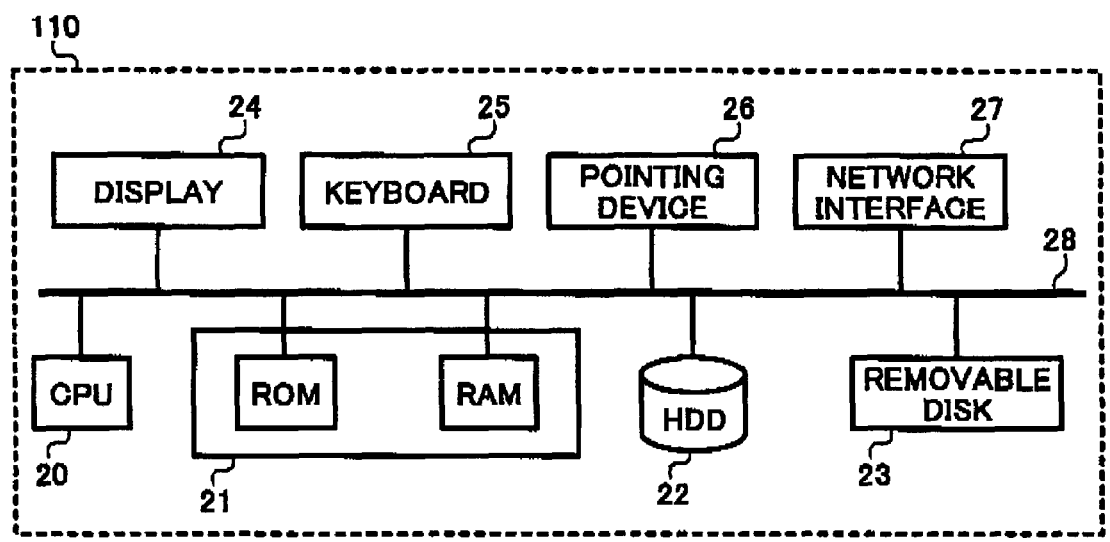
FIG. 17 is a block diagram illustrating an exemplary image processing system according to an exemplary embodiment of the present invention.

Any one of the image processors 1 and 10 and other image processors of the present invention may be incorporated into an image processing system 110 (such as a personal computer (PC)) shown in FIG. 17, for example.

The personal computer 110 includes a CPU (central processing unit) 20, a memory 21 including a ROM and a RAM, a HDD (hard disk drive) 22, a removable disc 23, a display 24, a keyboard 25, a pointing device 26, and a network interface 27, which are connected to one another via a bus 28.

The CPU 20 includes any kind of processor which controls the operation of the system 110. The ROM includes any kind of nonvolatile memory. The RAM includes any kind of volatile memory. The HDD 22 includes any kind of storage device capable of storing various data, including an image processing program of the present invention. The removable disc 23 includes any kind of removable medium, such as a floppy disk, CDs, DVDs, or a magnetic-optical disc, capable of storing various data, including the image processing program of the present invention. The display 24 includes any kind of display capable of displaying various data, such as a liquid crystal display, for example. The keyboard 25 includes any kind of device allowing a user to input an instruction to the system 110. The pointing device 26 includes a mouse, for example, allowing a user to point to a message or an image displayed on the display 24. The network interface 27, which may be optionally provided, allows the system 110 to communicate with other apparatuses via a communication line or a network.

According to the present invention, the HDD 22, the removable disc 23, and the network interface 27 together function as a storage device capable of storing the image processing program of the present invention. In one example, the CPU 20 may read the image processing program stored in the removable disc 23, and install it on the HDD 22. In another example, the CPU 20 may download the image processing program from a network, such as the Internet, through the network interface 27, and install it on the HDD 22. When downloading, a storage device storing the image processing program functions as a storage medium of the present invention.

In operation, the CPU 20 loads the image processing program from HDD 22 into RAM, and operates according to the present invention.

Figure 18:
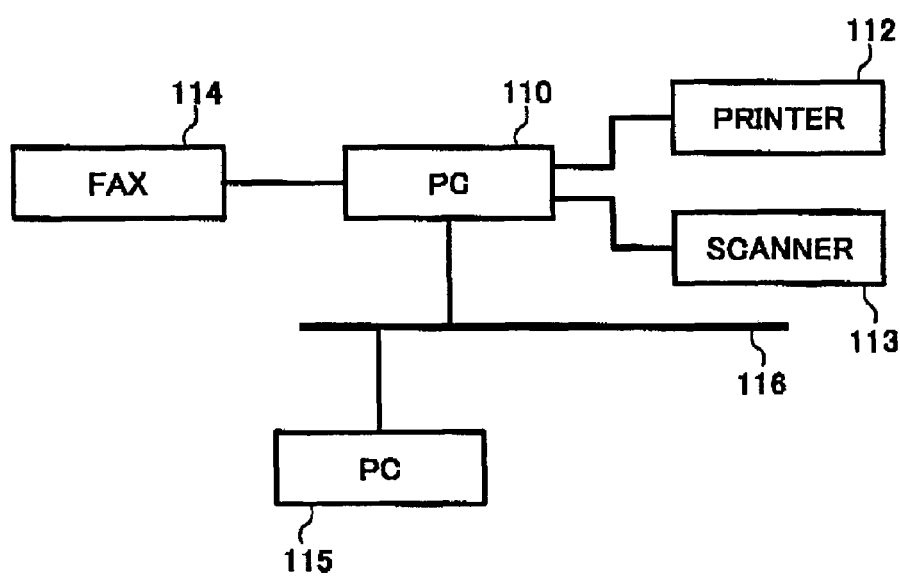
FIG. 18 is a block diagram illustrating an exemplary image processing system according to an exemplary embodiment of the present invention.

As illustrated in FIG. 18, for example, the image processing system 110 may further include any kind of peripheral devices. In FIG. 18, the system 110 is connected locally to a printer 112, a scanner 113, and a fax 114. The system 110 is further connected to another image processing system 115 via a network.

In one exemplary operation, the image processing system 110 receives an original image from the scanner 113 or the fax 114 as image data, applies image processing of the present invention to the original image, and outputs the processed image to a printer 112.

In another exemplary operation, the image processing system 110 receives an original image from the network as image data, applies image processing of the present invention to the original image, and outputs the processed image to the network.

Numerous additional modifications and variations are possible in light of the above teachings. It is therefore to be understood that within the scope of the appended claims, the disclosure of this patent specification may be practiced in a variety of ways not limited to those specifically described herein.

For example, the exemplary operations shown in FIGS. 2 and 10 generate a low resolution binary image before binarization, however, binarization may be applied directly to an original image. In another example, the exemplary operations shown in FIGS. 2 and 10 generate a high resolution image corresponding to an original image, however, the resolution of the original image may not need to be changed. In yet another example, the steps in the exemplary operations show in FIGS. 2 and 10 may be preformed in different orders.

As mentioned above, the present invention may be implemented using one or more conventional general purpose microprocessors and/or signal processors programmed according to the above teachings, as will be apparent to those skilled in the art. Alternatively, the present invention may be implemented by ASIC, prepared by interconnecting an appropriate network of conventional component circuits or by a combination thereof with one or more convention general purpose microprocessors and/or signal processors programmed accordingly.

What is claimed as new and desired to be protected by Letters Patent of the United States is:

1. An image processing apparatus, comprising:
a character extractor configured to generate a low resolution image based on an original image and to extract a character image from the low resolution image to generate a character image;
a character color extractor configured to extract color information of the character from the character image;
a main color palette generator configured to generate a main color palette including a main color representing a main color cluster being extracted from the character image based on the color information;
a minor color palette generator configured to generate a minor color palette including a minor color representing a minor color cluster being extracted from the character image based on the color information; and
a processed image generator configured to assign a character color, defined by any one of the main color of the main color palette and the minor color of the minor color palette, to the character in the character image such that the character is produced in the character color.

2. The image processing apparatus of claim 1, further comprising:
a high resolution character image generator configured to increase a resolution of the character in the character image to generate a high resolution character image, wherein the character color is assigned to the high resolution character in the high resolution character image.

3. The image processing apparatus of claim 2, wherein the main color palette generator comprises:
a main color histogram generator configured to generate a first histogram indicating a color distribution of pixels in the character image;
a main color cluster extractor configured to identify a peak of the first histogram and extracting a cluster of pixels located close to the peak as a first cluster; and
a main color cluster color extractor configured to define a first color representing the first cluster, wherein the first color is included in the main color palette as the main color.

4. The image processing apparatus of claim 3, wherein the minor color palette generator comprises:
a minor color histogram generator configured to select the pixels not belonging to the first cluster and to generate a second histogram indicating a color distribution of the selected pixels in the character image;
a minor color cluster extractor configured to identify a peak of the second histogram and to extract a cluster of pixels located close to the peak as a second cluster; and
a minor color extractor configured to define a second color representing the second cluster, wherein the second color is included in the minor color palette as the minor color.

5. The image processing apparatus of claim 3, wherein the main color palette generator configured to carry out the steps of generating the main color histogram, extracting the cluster of pixels and defining the first color representing the respective extracted cluster, is further configured to repeat the steps of generating the main color histogram, extracting the cluster of pixels and defining the first color representing the respective extracted cluster until no additional color clusters are extracted.

6. An image processing method comprising:
performing with a processor the steps of:
dividing an original image into a character image including a character and a background image corresponding to the portion of the original image other than the character image;
obtaining color information of the character in the character image from the character image;
extracting a main color cluster based on the color information;
generating a main color palette including a main color representing the main color cluster;
extracting a minor color cluster based on the color information;
generating a minor color palette including a minor color representing the minor color cluster;
assigning a character color, defined by any one of the main color of the main color palette and the minor color of the minor color palette, to the character in the character image; and
generating a high resolution character image corresponding to the character image by increasing a resolution of the character in the character image, wherein the character color is assigned to the high resolution character image in the high resolution character image.

7. The image processing method of claim 6, further comprising:
   generating a high resolution background image corresponding to the background image; and
   combining the high resolution character image and the high resolution background image.

8. The image processing method of claim 6, further comprising repeating the steps of extracting the main color cluster based on the color information and generating the main color palette including the main color representing the main color cluster are repeated until no additional main color clusters are extracted.

9. An image processing system, comprising:
   a processor;
   a storage device configured to store a plurality of instructions which, when activated by the processor, cause the processor to:
      divide an original image into a character image including a character and a background image corresponding to the portion of the original image other than the character image;
      obtain color information of the character in the character image from the character image;
      extract a main color cluster, based on the color information;
      generate a main color palette including a main color representing the main color cluster;
      extract a minor color cluster, based on the color information;
      generate a minor color palette including a minor color representing the minor color cluster;
      assign a character color defined by any one of the main color of the main color palette and the minor color of the minor color palette to the character in the character image; and
      generate a high resolution character image corresponding to the character image by increasing a resolution of the character in the character image,
      wherein the character color is assigned to the high resolution character image in the high resolution character image.

10. The image processing system of claim 9, wherein the processor is further instructed to extract additional main color clusters based on the color information and generate main color palettes including the main color representing the respective additional main color cluster until no more main color clusters can be extracted.

11. A computer readable medium storing computer instructions for causing a computer to perform an image processing operation including:
   dividing an original image into a character image including a character and a background image corresponding to the portion of the original image other than the character image;
   obtaining color information of the character in the character image from the character image;
   extracting a main color cluster based on the color information;
   generating a main color palette including a main color representing the main color cluster;
   extracting a minor color cluster based on the color information;
   generating a minor color palette including a minor color representing the minor color cluster;
   assigning a character color, defined by any one of the main color of the main color palette and the minor color of the minor color palette, to the character in the character image; and
   generating a high resolution character image corresponding to the character image by increasing a resolution of the character in the character image,
   wherein the character color is assigned to the high resolution character image in the high resolution character image.

12. The image processor operation of claim 11, further comprising repeating the steps of extracting the main color cluster based on the color information and generating the main color palette including the main color representing the main color cluster are repeated until no additional main color clusters are extracted.

* * * * *